United States Patent [19]

Eadara et al.

[11] Patent Number: 5,169,890
[45] Date of Patent: Dec. 8, 1992

[54] THERMOPLASTIC HOT MELT ADHESIVE

[75] Inventors: Rajan Eadara, East Lansing; Julie Szymborski, Lake Orion; Irvin Jackson, Detroit, all of Mich.

[73] Assignee: Ciba-Geigy Corporation, Ardsley, N.Y.

[21] Appl. No.: 775,322

[22] Filed: Oct. 11, 1991

[51] Int. Cl.$^5$ .......................... C08K 5/01; C08K 5/02; C08L 9/00; C08L 53/02
[52] U.S. Cl. .................................... 524/271; 524/290; 524/323; 524/333; 524/462; 524/463; 524/488; 525/98; 525/99; 525/236; 525/237
[58] Field of Search ............... 524/271, 290, 323, 333, 524/462, 463, 488; 525/98, 99, 236, 237

[56] References Cited

U.S. PATENT DOCUMENTS

| | | | |
|---|---|---|---|
| 3,078,254 | 2/1963 | Zelinski et al. | 260/45.5 |
| 3,135,716 | 6/1964 | Uraneck et al. | 260/45.5 |
| 3,231,635 | 1/1966 | Holden et al. | 260/880 |
| 3,239,478 | 3/1966 | Harlan, Jr. | 260/27 |
| 3,427,269 | 2/1969 | Davis et al. | 260/27 |
| 3,468,972 | 9/1969 | Haien | 260/836 |
| 3,594,452 | 7/1971 | Beriger et al. | 260/941 |
| 3,595,941 | 7/1971 | Farrar et al. | 260/879 |
| 3,700,633 | 10/1972 | Wald et al. | 260/880 |
| 4,092,282 | 5/1978 | Callan | 524/271 |
| 4,835,200 | 5/1989 | St. Clair | 524/109 |
| 4,943,237 | 7/1990 | Bryan | 428/542.8 |
| 4,946,529 | 8/1990 | Huddleston | 525/237 |
| 5,060,981 | 10/1991 | Flossum et al. | 283/75 |

Primary Examiner—Paul R. Michl
Assistant Examiner—Tae H. Yoon
Attorney, Agent, or Firm—JoAnn Villamizar

[57] ABSTRACT

The present invention relates to a thermoplastic hot melt adhesive comprising (a) a block copolymer, said block copolymer being prepared utilizing a bromide based coupling agent, said block copolymer comprising at least two monoalkenyl arene polymer end blocks A and at least one elastomeric conjugated diene polymer mid block B, and said block copolymer having about 8 to about 65 percent by weight of said monoalkenyl arene polymer block content, each polymer block A having an average molecular weight of between about 5,000 and about 125,000, and each polymer block B having an average molecular weight of between about 10,000 and about 300,000,
(b) a polyisobutylene rubber,
(c) a partially cross-linked polyisobutylene rubber
(d) a compatible tackifying resin,
(e) a phenolic antioxidant,
(f) a non-reactive phenolic resin,
(g) a fluorocarbon surface active agent, and
(h) a petroleum derived wax.

20 Claims, No Drawings

THERMOPLASTIC HOT MELT ADHESIVE

BACKGROUND OF THE INVENTION

The present invention relates to a thermoplastic hot melt adhesive which is capable of bonding similar and dissimilar substrates, provides a seal for moisture vapor permeability in the temperature range between −30° C. to 90° C. and is particularly suitable for bonding automotive head lamp and tail lamp lenses to the reflector housing as no fogging of the lamp lens occurs during the bonding process.

While a wide range of uses for hot melt adhesive compositions are known throughout the automotive industry, it has been found that a hot melt adhesive for bonding in a particular use or application may be completely unsuitable for other uses or applications. Thus, various hot melt adhesive compositions have been proposed for use in the automotive industry for bonding automotive head lamp and tail lamp lenses to the reflector housing. The adhesive must possess certain physical properties for this particular application. The adhesive must exhibit good adhesion to glass, polycarbonate, acrylates, polyesters and aluminum, good flow resistance up to 90° C., resistance to moisture vapor permeability, high tensile strength and high elongation, good flow characteristics at 170° C. and quick bond formation upon cooling to room temperature.

U.S. Pat. No. 4,835,200 discloses a color stable hot melt adhesive composition useful for product assembly applications such as multiline adhesive used in the construction of disposable diapers, sanitary napkins and bed pads. The adhesive composition contains a block copolymer prepared using a bromide based coupling agent, a tackifying resin and a stabilizer composition containing a thio compound, a phenolic antioxidant, a tris-(nonylated phenyl)phosphite and an aliphatic compatible epoxy compound.

It is a primary object of the present invention to provide a thermoplastic hot melt adhesive suitable for bonding automotive head lamp and tail lamp lenses to the reflector housing.

Further objects and advantages of this invention will become apparent from the following descriptive material and illustrative examples.

SUMMARY OF THE INVENTION

The present invention relates to a thermoplastic hot melt adhesive which is capable of bonding similar and dissimilar substrates, provides a seal for moisture vapor permeability in the temperature range between −30° C. to 90° C. and is particularly suitable for bonding automotive head lamp and tail lamp lenses to the reflector housing as no fogging of the lamp lens occurs during the bonding process.

DETAILED DESCRIPTION OF THE INVENTION

The present invention relates to a thermoplastic hot melt adhesive comprising
(a) a block copolymer, said block copolymer being prepared utilizing a bromide based coupling agent, said block copolymer comprising at least two monoalkenyl arene polymer end blocks A and at least one elastomeric conjugated diene polymer mid block B, and said block copolymer having about 8 to about 65 percent by weight of said monoalkenyl arene polymer block content, each polymer block A having an average molecular weight of between about 5,000 and about 125,000, and each polymer block B having an average molecular weight of between about 10,000 and about 300,000,
(b) a polyisobutylene rubber,
(c) a partially cross-linked polyisobutylene rubber
(d) a compatible tackifying resin,
(e) a phenolic antioxidant,
(f) a non-reactive phenolic resin,
(g) a fluorocarbon surface active agent, and
(h) a petroleum derived wax.

The block copolymers employed in the present composition are thermoplastic elastomers and have at least two monoalkenyl arene polymer end blocks A and at least one elastomeric conjugated diene polymer mid block B and are described in detail in U.S. Pat. No. 4,835,200, which is hereby incorporated by reference. The number of blocks in the block copolymer is not of special importance and the macromolecular configuration may be linear, graft, radial or star depending upon the method by which the block copolymer is formed. Typical block copolymers of the most simple configuration would have the structure polystyrene-polybutadiene-polystyrene (S-B-S) and polystyrene-polyisoprene-polystyrene (S-I-S). A typical radial or star polymer would comprise one in which the diene block has three or four branches (radial) or five or more branches (star), the tip of each branch being connected to a polystyrene block.

It will be understood that both blocks A and B may be either homopolymer, random or tapered copolymer blocks as long as each block predominates in at least one class of the monomers characterizing the blocks defined herinabove. Thus, blocks A may comprise styrene/alpha-methylstyrene copolymer blocks or styrene/butadiene random or tapered copolymer blocks as long as the blocks individually predominate in monoalkenyl arenes. The term "monoalkenyl arene" will be taken to include particularly those of the benzene series such as styrene and its analogues and homologues including alpha-methylstyrene and ring alkylated styrenes, particularly ring-methylated styrenes, and other monoalkenyl polycyclic aromatic compounds such as vinyl naphthalene and the like. The preferred monoalkenyl arenes are styrene and alpha-methylstyrene, and styrene is particularly preferred.

The blocks B may comprise homopolymers of conjugated diene monomers, copolymers of two or more conjugated dienes, and copolymers of one of the dienes with a monoalkenyl arene as long as the blocks B predominate in conjugated diene units. The conjugated dienes are preferably ones containing from 4 to 8 carbon atoms. Examples of suitable such conjugated diene monomers include: butadiene, isoprene, 2,3-dimethyl-1,3-butadiene, and piperylene, preferably butadiene and isoprene.

The blocks B may or may not be hydrogenated as taught, for example, in U.S. Pat. No. 3,700,633. This hydrogenation may be either partial or substantially complete. Selected conditions may be employed for example to hydrogenate the blocks B while not so modifying the blocks A. Other conditions may be chosen to hydrogenate uniformly along the polymer chain, both blocks A and B thereof being hydrogenated to practically the same extent, which may be either partial or substantially complete.

The average molecular weights of the individual blocks may vary within certain limits. In most instances, the monoalkenyl arene blocks will have average molecular weights in the order of about 5,000 to about 125,000, preferably about 6,000 to about 60,000, while the conjugated diene blocks either before or after hydrogenation will have average molecular weights in the order of about 10,000 to about 300,000, preferably about 30,000 to about 150,000. The total average molecular weight of the multiblock copolymer is typically in the order of about 25,000 to about 350,000, preferably from about 35,000 to about 300,000. These molecular weights are most accurately determined by gel permeation chromatography.

The proportion of the monoalkenyl arene blocks should be between about 8 and about 65 percent by weight of the multiblock copolymer, preferably between about 10 and 40 percent by weight.

The general type and preparation of these block copolymers are described in U.S. Pat. Nos. Re. 28,246; 3,239,478; and 3,427,269, which are hereby incorporated by reference. Typically, the first step of the polymerization process involves contacting the monoalkenyl arene and an organomonolithium compound (initiator) in the presence of an inert diluent therein forming a living polymer compound having the simplified structure A-Li. The inert diluent may be an aromatic or naphthenic hydrocarbon, e.g., benzene or cyclohexane, which may be modified by the presence of an alkene or alkane such as pentenes or pentanes. Specific examples of suitable diluents include n-pentane, n-hexane, isooctane, cyclohexane, toluene, benzene, xylene and the like. The organomonolithium compounds (initiators) that are reacted with the polymerizable additive in step one are represented by the formula RLi; wherein R is an aliphatic, cycloaliphatic, or aromatic radical, or combinations thereof, preferably containing from 1 to 20 carbon atoms per molecule. Exemplary of these organomonolithium compounds are ethyllithium, n-propyllithium, isopropyllithium, n-butyllithium, sec-butyllithium, tert-octyllithium, n-decyllithium, n-eicosyllithium, phenyllithium, 2-naphthyllithium, 4-butylphenyllithium, 4-tolyllithium, 4-phenylbutyllithium, cyclohexyllithium, 3,5-di-n-hepthylcyclohexyllithium, 4-cyclopentylbutyllithium, and the like. The alkyllithium compounds are preferred, especially those wherein the alkyl group contains from 3 to 10 carbon atoms. A much preferred initiator is sec-butyllithium. See U.S. Pat. No. 3,231,635. The concentration of the initiator can be regulated to control molecular weight. Generally, the initiator concentration is in the range of about 0.25 to 50 millimoles per 100 grams of monomer although both higher and lower initiator levels can be used if desired. The required initiator level frequently depends upon the solubility of the initiator in the hydrocarbon diluent. These polymerization reactions are usually carried out at a temperature in the range of about −16° C. to about +149° C. and at pressures which are sufficient to maintain the reaction mixture in the liquid phase.

Next, the living polymer in solution is contacted with a conjugated diene. Preferred dienes include butadiene and isoprene. The resulting living polymer has a simplified structure A-B-Li. It is at this point that the living polymer is coupled.

There are a wide variety of coupling agents that can be employed. Any polyfunctional coupling agent which contains at least two reactive sites can be employed. Examples of the types of compounds which can be used include the polyepoxides, polyisocyanates, polyimines, polyaldehydes, polyketones, polyanhydrides, polyesters, polyhalides, and the like. These compounds can contain two or more types of functional groups such as the combination of epoxy and aldehyde groups, isocyanate and halide groups, and the like. Various other substituents which are inert in the treating reaction can be present such as hydrocarbon radicals as exemplified by the alkyl, cycloalkyl, aryl, aralkyl and alkaryl groups and the alkoxy, aryloxy, alkythio, arylthio, and tertiary amino groups. Many suitable types of these polyfunctional compounds have been described in U.S. Pat. Nos. 3,595,941; 3,468,972; 3,135,716; 3,078,254 and 3,594,452.

The block copolymer formed using these coupling agents has a simplified structure $(A-B)_n-X$ where X is a residual group of a polyfunctional coupling agent having two or more functional groups which forms the nucleus (branching point) of the block copolymer and n is an integer of two or more. Typically, n ranges from 2 to about 40. Thus, when the coupling agent has two reactive sites such as a dibromoalkane (e.g. dibromoethane), the polymer will have a linear A-B-X-B-A structure. However, since X has no noticeable effect on the properties of the resulting block copolymer, the polymer is said to have a linear A-B-A structure. Furthermore, when the coupling agent has three or more reactive sites, such as silicon tetrachloride, the polymer will have a branched structure, such as $(A-B)_4-Si$.

As noted above, a portion of the coupling agent is incorporated as the nucleus of the block copolymer. The remainder of the coupling agent presumably reacts with Li to form a coupling reaction by-product. In the case of polyhalide coupling agents, particularly where the halide is bromine, the by-product is a Br-containing compound. This Br-containing compound is suspected of causing brown color formed during the molten aging of the adhesive compositions comprising block copolymers which were prepared using bromine based coupling agents.

The typically coupling conditions include a temperature of between about 65° and about 77° C. and sufficient pressure to maintain the reactants in a liquid phase. Following the coupling reaction or when the desired coupling efficiency has been obtained, the product is neutralized such as by the addition of terminators, e.g. water, alcohol or other reagents, for the purpose of removing the lithium radical from the polymer product. The product is then recovered such as by coagulation utilizing hot water, steam or both.

The block copolymer is present to provide the adhesive with temperature resistance and toughening and is present in an amount of from about 12 to about 20 wt %, preferably about 15 to about 20 wt %, and most preferably 18 wt %.

A particularly preferred block copolymer is a styrene-ethylene-butylene-styrene block copolymer, such as KRATON® G1652 from Shell Oil Company.

The polyisobutylene rubber is employed as a diluent to improve flow properties of the adhesive composition. The polyisobutylene rubber preferably has a molecular weight in the range of from about 800 to about 5000, most preferably about 800. The polyisobutylene rubber is present in the adhesive composition in an amount of from about 18–25 wt %, preferably about 22 wt %.

The partially cross-linked isobutylene rubber is present to provide the adhesive composition with flow resistance at 90° C. and is present in an amount of from about 2 to about 6 wt %, preferably about 4 to about 6 wt %, and most preferably 4 wt %.

The block copolymer by itself is not sufficiently tacky or sticky. Therefore, it is necessary to add a tackifying resin that is compatible with the elastomeric conjugated diene block B and, optionally, to add one that is compatible with the monoalkenyl arene block A. The tackifying resins useful in the adhesive compositions can be hydrocarbon resins, synthetic polyterpenes, rosin esters, natural terpenes, and the like. More particularly, the useful tackifying resins include any compatible resins or mixtures thereof such as (1) natural and modified rosins such, for example, as gum rosin, wood rosin, talloil rosin, distilled rosin, hydrogenated rosin, dimerized rosin, and polymerized rosin; (2) glycerol and pentaerythritol esters of natural and modified rosins, such, for example as the glycerol ester of pale, wood rosin, the glycerol ester of hydrogenated rosin, the glycerol ester of polymerized rosin, the pentaerythritol ester of hydrogenated rosin, and the phenolic modified pentaerythritol ester of rosin; (3) copolymers and terpolymers of natural terpenes, e.g. styrene/terpene and alpha methyl styrene/terpene; (4) polyterpene resins having a softening point, as determined by ASTM method E28-58T, of from about 80° to 150° C.; the latter polyterpene resins generally resulting from the polymerization of terpene hydrocarbons, such as the bicyclic monoterpene known as pinene, in the presence of Friedel-Crafts catalysts at moderately low temperatures; also included are the hydrogenated polyterpene resins; (5) phenolic modified terpene resins and hydrogenated derivatives thereof such, for example, as the resin product resulting from the condensation, in an acidic medium, of a bicyclic terpene and a phenol; (6) aliphatic petroleum hydrocarbon resins having a Ball and Ring softening point of from about 70° to 135° C.; the latter resins resulting from the polymerization of monomers consisting primarily of olefins and diolefins; also included are the hydrogenated aliphatic petroleum hydrocarbon resins; (7) aromatic petroleum hydrocarbon resins and the hydrogenated derivatives thereof; and (8) alicyclic petroleum hydrocarbon resins and the hydrogenated derivatives thereof. Mixtures of two or more of the above described tackifying resins may be preferably for some formulations.

The selection of the particular tackifying agent is, in large part, dependent upon the specific block copolymer employed in the respective adhesive composition. Hydrogenated aliphatic petroleum hydrocarbon resins having a Ball and Ring softening point of from about 70° to 135° C.; hydrogenated aromatic petroleum hydrocarbon resins; hydrogenated alicyclic petroleum hydrocarbon resins; and mixtures thereof are preferred.

The tackifying resin is present in an amount of from about 30 to about 40 wt %, preferably about 35 to about 40 wt %, and most preferably about 36 wt %.

Phenolic antioxidants are well known to those skilled in the art and may be characterized as phenolic compounds which also contain sterically bulky groups in close proximity to the phenolic hydroxyl group thereof. In particular, tertiary butyl groups generally are substituted onto the benzene ring in at least one of the ortho positions relative to the phenolic hydroxy group. Representative phenolic antioxidants include:
2,6-di-tertiary-butyl phenol;
2,6-di-tertiary-butyl-4-methyl phenol;
tetrakis-[methylene-(3,5-di-tertiary-butyl-4-hydroxyhydrocinnanamate)] methane;
1,3,5-tri-methyl-2,4,6-tris-(3,5-di-tertiary-butyl-4-hydroxy-benzyl)benzene;
pentaerythrityl tetrakis-[3-(3,5-di-tertiary-butyl-4-hydroxyphenyl)propionate];
n-octadecyl-3-(3,5-di-tertiary-butyl-4-hydroxyphenyl)-propionate
4,4'-methylene-bis-(2,6-di-tertiary-butyl-phenol);
4,4'-thio-bis-(6-tertiary-butyl-o-cresol);
2,4-bis-(n-octylthio)-6-(4-hydroxy-phenoxy)-1,3,5-triazine;
di-n-octadecyl-3,5-di-tertiary-butyl-4-hydroxybenzylphosphonate;
2-(n-octylthio)ethyl-3,5-di-tertiary-butyl-4-hydroxybenzoate; and
sorbitol hexa-[3-(3,5-di-tertiary-butyl-4-hydroxyphenyl)propionate].

These phenolic antioxidants are generally present singly or in combination of two or more of these in a total amount of about 1 to about 3 wt %, preferably about 2 wt %.

Suitable non-reactive thermoplastic phenolic resins include phenol novolac resin, cashewnut oil modified phenol formaldehyde novolac resin, alkyl phenol formaldehyde novolac resin, alkyl phenolic resin and the like.

The non-reactive thermoplastic phenolic resin is present in an amount of from about 3 to 6 wt %, preferably about 3 to about 5 wt %, and most preferably about 4.7 wt % in order to increase tack.

The adhesive composition additionally includes a fluorocarbon surface active agent in an amount of from about 0.2 wt about 0.5 wt %, preferably about 0.4 wt %.

Various petroleum derived waxes are present in the adhesive composition in an amount of from about 8 to about 15 wt %, preferably about 10 to about 12 wt %, and most preferably about 11 wt % in order to impart fluidity to the molten condition of the adhesive and flexibility and moisture resistance to the set adhesive. The term "petroleum derived wax" includes microcrystalline waxes having melting points within the range of about 54° C. to about 135° C. as well as synthetic waxes such as low molecular weight polyethylene or Fisher-Tropsch waxes. Particularly preferred for use in the adhesive composition according to this invention is ACCUMIST®B-12 micronized polyethylene wax from Allied Signal.

The adhesive composition may also contain other conventional modifiers such as extenders, fillers and reinforcing agents, pigments, dyestuffs, organic solvents, plasticizers, tackifiers, rubbers, diluents, adhesion promoters, such as epoxy silane, and the like. As extenders, reinforcing agents, fillers and pigments which can be employed in the epoxy resin component according to the invention there may be mentioned, for example: glass fibers, glass balloons, boron fibers, carbon fibers, cellulose, polyethylene powder, polypropylene powder, mica, quartz powder, gypsum, antimony trioxide, bentones, talc, silica aerogel ("Aerosil"), fumed silica, wollastonite, silane treated wollastonite, lithopone, barite, calcium carbonate, titanium dioxide, carbon black, graphite, iron oxide, or metal powders such as aluminum powder or iron powder. It is also possible to add other usual additives, for example, agents for conferring thixotropy, flow control agents such as silicones, cellulose acetate butyrate, polyvinyl butyral, stearates and the like.

A vertical type high-speed agitator, kneading machine, roll machine, ball mill or any other suitable mixing and agitating machine may be used for dispersion of the components of the composition of the present invention.

The thermoplastic hot melt adhesive of the present invention is particularly useful for bonding automotive head lamp and tail lamp lenses to the reflector housing as no fogging of the lamp lens occurs during the bonding process.

EXAMPLES

The following examples serve to give specific illustrations of the practice of this invention but they are not intended in any way to limit the scope of this invention.

EXAMPLE 1

This example illustrates the preparation of a typical composition of the present invention.

| Component | Weight Percent |
|---|---|
| KRATON ® G1652 | 18.0 |
| (Styrene-ethylene-butylene-styrene block copolymer from Shell Oil Company) | |
| KALENE ® 800 | 22.0 |
| (Polyisobutylene rubber-molecular weight 800 from Hardman Chemical Company) | |
| KALAR ® 5263 | 4.0 |
| (Partially cross-linked polyisobutylene rubber from Hardman Chemical Company) | |
| ESCOREZ ® 5340 | 36.0 |
| (Hydrogenated hydrocarbon tackifying resin from Exxon Chemical Company) | |
| IRGANOX ® 1010 | 2.0 |
| (Phenolic antioxidant from CIBA-GEIGY Corporation) | |
| TiO$_2$ | 1.8 |
| Carbon Black | 0.1 |
| DUREZ ® 31671 | 4.7 |
| (Nonreactive phenolic resin from Occidental Chemical Company) | |
| FLUORAD ® FC 430 | 0.4 |
| (Fluorocarbon surface active agent from 3M Chemical Company) | |
| POLYMIST ® B-12 | 11.0 |
| (Micronized polyethylene wax from Allied-Signal Company) | |

The polyisobutylene rubber, hydrogenated hydrocarbon tackifying resin and the cross linked polyisobutylene rubber are charged to a high shear kneader-extruder at 100°–110° C. The mixture is blended for 1 hour to a uniform mass under vacuum. The phenolic antioxidant is then charged to the kneader-extruder. The styrene-ethylene-butylene-styrene block copolymer is then charged in steps at 100°–110° C. and the mixture blended for 1–2 hours under vacuum to a uniform mass. The nonreactive phenolic resin, TiO$_2$ and carbon black are then charged to the kneader-extruder at 100°–120° C. and the mixture blended for 1 hour under vacuum. The micronized polyethylene wax is then charged to the kneader-extruder at 140° C. and the mixture blended for 1 hour under vacuum. The fluorocarbon surface active agent is then charged to the kneader-extruder at 140°–150° C. and the mixture blended for 1–2 hours under vacuum. The mixture is then discharged at 150° C.

The properties of the adhesive composition are provided in Table 1. The viscosity is measured using a Rheometrics Dynamic Analyzer Model 700, adhesion is measured as the lap shear strength under tension using an Instron Model 1123 and tensile strength and % elongation are measured using an Instron Model 1123.

TABLE 1

| Thermoplastic Hot Melt Adhesive Properties | |
|---|---|
| No separation on thermal aging (72 hours at 170° C.) | |
| Nonreactive | |
| Thermoplastic | |
| No outgasing and fogging | |
| Color | Gray/Amber |
| Specific gravity | 0.95–1.0 |
| Application Temperature | 170–190° C. |
| Viscosity (poise) | |
| 25° C. | $2.0 \times 10^6$ |
| 90° C. | $1.6 \times 10^5$ |
| 150° C. | $3.0 \times 10^3$ |
| Adhesion(Mpa) | 1–1.5 |
| (Glass, Polycarbonate, Aluminum) | |
| Tensile Strength (MPa) | 2.5–3.5 |
| Percent Elongation | 400 |

What is claimed is:

1. A thermoplastic hot melt adhesive comprising
   (a) a block copolymer, said block copolymer being prepared utilizing a bromide based coupling agent, said block copolymer comprising at least two monoalkenyl arene polymer end blocks A and at least one elastomeric conjugated diene polymer mid block B, and said block copolymer having about 8 to about 65 percent by weight of said monoalkenyl arene polymer block content, each polymer block A having an average molecular weight of between about 5,000 and about 125,000, and each polymer block B having an average molecular weight of between about 10,000 and about 300,000,
   (b) a polyisobutylene rubber,
   (c) a partially cross-linked polyisobutylene rubber
   (d) a compatible tackifying resin,
   (e) a phenolic antioxidant,
   (f) a non-reactive thermoplastic phenolic resin,
   (g) a fluorocarbon surface active agent, and
   (h) a petroleum derived wax.

2. A thermoplastic hot melt adhesive according to claim 1 wherein said block copolymer present in an amount of from about 12 to about 20 wt %.

3. A thermoplastic hot melt adhesive according to claim 1 wherein said block copolymer is a styrene-ethylene-butylene-styrene block copolymer.

4. A thermoplastic hot melt adhesive according to claim 1 wherein said polyisobutylene rubber is present in an amount of from about 18 to about 25 wt %.

5. A thermoplastic hot melt adhesive according to claim 1 wherein said partially cross-linked polyisobutylene rubber is present in an amount of from about 2 to about 6 wt %.

6. A thermoplastic hot melt adhesive according to claim 1 wherein said partially cross-linked polyisobutylene rubber is present in an amount of from about 4 to about 6 wt %.

7. A thermoplastic hot melt adhesive according to claim 1 wherein said compatible tackifying resin is selected from the group consisting of hydrocarbon resins, synthetic polyterpenes, rosin esters and natural terpenes.

8. A thermoplastic hot melt adhesive according to claim 1 wherein said compatible tackifying resin is selected from the group consisting of natural and modified rosins; glycerol and pentaerythritol esters of natural and modified rosins; copolymers and terpolymers of natural terpenes; polyterpene resins having a softening point of from about 80° C. to 150° C.; phenolic modified terpene resins and hydrocarbon derivatives thereof; aliphatic petroleum hydrocarbon resins having a Ball and Ring softening point of from about 70° to 135° C.; aromatic petroleum hydrocarbon resins and the hydrogenated derivatives thereof; alicyclic petroleum hydrocarbon resins and the hydrogenated derivatives thereof; and mixtures thereof.

9. A thermoplastic hot melt adhesive according to claim 1 wherein said compatible tackifying resin is selected from the group consisting of hydrogenated aliphatic petroleum hydrocarbon resins having a Ball and Ring softening point of from about 70° to 135° C.; hydrogenated aromatic petroleum hydrocarbon resins; hydrogenated alicyclic petroleum hydrocarbon resins; and mixtures thereof.

10. A thermoplastic hot melt adhesive according to claim 1 wherein said compatible tackifying resin is present in an amount of from about 30 to about 40 wt %.

11. A thermoplastic hot melt adhesive according to claim 1 wherein said compatible tackifying resin is present in an amount of from about 35 to about 40 wt %.

12. A thermoplastic hot melt adhesive according to claim 1 wherein said phenolic antioxidant is present singly or in combination of two or more in a total amount of from about 1 to about 3 wt %.

13. A thermoplastic hot melt adhesive according to claim 1 wherein said non-reactive thermoplastic phenolic resin is selected from the group consisting of phenol novolac resin, cashewnut oil modified phenol formaldehyde novolac resin, terpene phenolic resins, alkyl phenol formaldehyde novolac resin and alkyl phenolic resin.

14. A thermoplastic hot melt adhesive according to claim 1 wherein said non-reactive thermoplastic phenolic resin is present in an amount of from about 3 to 6 wt %.

15. A thermoplastic hot melt adhesive according to claim 1 wherein said non-reactive thermoplastic phenolic resin is present in an amount of from about 3 to about 5 wt %.

16. A thermoplastic hot melt adhesive according to claim 1 wherein said fluorocarbon surface active agent is present in an amount of from about 0.2 wt about 0.5 wt %.

17. A thermoplastic hot melt adhesive according to claim 1 wherein said petroleum derived wax is present in an amount of from about 8 to about 15 wt %.

18. A thermoplastic hot melt adhesive according to claim 1 wherein said petroleum derived wax is present in an amount of from about 10 to about 12 wt %.

19. A thermoplastic hot melt adhesive according to claim 1 comprising
    (a) about 18 wt % of a block copolymer, said block copolymer being prepared utilizing a bromide based coupling agent, said block copolymer comprising at least two monoalkenyl arene polymer end blocks A and at least one elastomeric conjugated diene polymer mid block B, and said block copolymer having about 8 to about 65 percent by weight of said monoalkenyl arene polymer block content, each polymer block A having an average molecular weight of between about 5,000 and about 125,000, and each polymer block B having an average molecular weight of between about 10,000 and about 300,000,
    (b) about 22 wt % of a polyisobutylene rubber,
    (c) about 4 wt % of a partially cross-linked polyisobutylene rubber
    (d) about 36 wt % of a compatible tackifying resin,
    (e) about 2 wt % of a phenolic antioxidant,
    (f) about 4.7 wt % of a non-reactive thermoplastic phenolic resin,
    (g) about 0.4 wt % of a fluorocarbon surface active agent, and
    (h) about 11 wt % of a petroleum derived wax.

20. A thermoplastic hot melt adhesive according to claim 1 comprising
    (a) about 18 wt % of a styrene-ethylene-butylene-styrene block copolymer,
    (b) about 22 wt % of a polyisobutylene rubber,
    (c) about 4 wt % of a partially cross-linked polyisobutylene rubber
    (d) about 36 wt % of a hydrogenated hydrocarbon tackifying resin,
    (e) about 2 wt % of a phenolic antioxidant,
    (f) about 4.7 wt % of a non-reactive thermoplastic phenolic resin selected from the group consisting of phenol novolac resin, cashewnut oil modified phenol formaldehyde novolac resin, terpene phenolic resins, alkyl phenol formaldehyde novolac resin and alkyl phenolic resin,
    (g) about 0.4 wt % of a fluorocarbon surface active agent, and
    (h) about 11 wt % of a petroleum derived wax.

* * * * *